(12) United States Patent
Liu

(10) Patent No.: US 6,924,107 B2
(45) Date of Patent: Aug. 2, 2005

(54) FOUR DIMENSIONAL BIOCHIP DESIGN FOR HIGH THROUGHPUT APPLICATIONS AND METHODS OF USING THE FOUR DIMENSIONAL BIOCHIP

(75) Inventor: Ben Hui Liu, 5720 Thistleton La., Raleigh, NC (US) 27606

(73) Assignees: Bio-Informatics Group, Inc., Cary, NC (US); Ben Hui Liu, Raleigh, NC (US)

(*) Notice: Subject to any disclaimer, the term of this patent is extended or adjusted under 35 U.S.C. 154(b) by 0 days.

(21) Appl. No.: 10/055,878

(22) Filed: Jan. 28, 2002

(65) Prior Publication Data

US 2003/0143722 A1 Jul. 31, 2003

(51) Int. Cl.[7] .................. C12Q 1/68; C12N 15/00; C12N 15/63; C12N 1/20; C07H 21/04
(52) U.S. Cl. ............... 435/6; 435/320.1; 435/252.8; 435/174; 435/183; 382/129; 382/133; 382/153; 382/173; 382/286; 382/291; 702/19; 702/22; 935/10; 935/24; 935/72; 536/22.1
(58) Field of Search .................. 435/6, 91.1, 91.2, 435/452; 536/24.3; 935/6; 436/518; 204/452, 603, 604, 451, 453

(56) References Cited

U.S. PATENT DOCUMENTS

| 4,085,780 A | 4/1978 | Holley et al. |
| 4,446,104 A | 5/1984 | Hämmerling et al. |
| 5,131,994 A * | 7/1992 | Shmidt et al. ............... 204/518 |
| 5,567,294 A | 10/1996 | Dovichi et al. |
| 5,580,523 A | 12/1996 | Bard et al. |
| 5,759,779 A | 6/1998 | Dehlinger et al. |
| 6,406,604 B1 * | 6/2002 | Guzman ..................... 204/601 |

FOREIGN PATENT DOCUMENTS

| DE | 19712195 | 9/1998 |
| JP | 6-294771 | 10/1994 |
| WO | 99/13313 | 3/1999 |
| WO | 99/32219 | 7/1999 |
| WO | 99/55460 | 11/1999 |
| WO | 00/49382 | 8/2000 |
| WO | 01/26798 | 4/2001 |
| WO | 01/26799 | 4/2001 |

* cited by examiner

Primary Examiner—Jezia Riley
(74) Attorney, Agent, or Firm—J. Derek Mason; Oblon, Spivak, McClelland, Maier & Neustadt, P.C.

(57) ABSTRACT

The present invention provides a 4D biochip containing m 3D biochips having n capillaries, wherein the n capillaries each contain a biological factor, and methods for preparing and using the 4D biochip to provide rapid, efficient assays of large quantities of samples and/or factors.

55 Claims, 8 Drawing Sheets

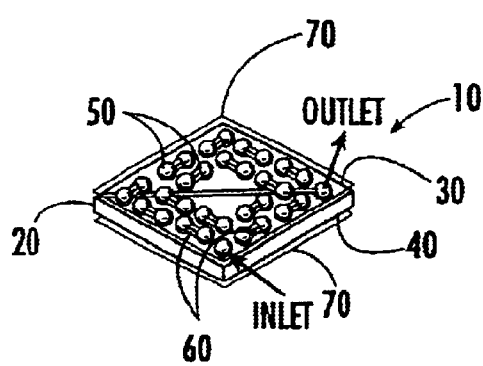
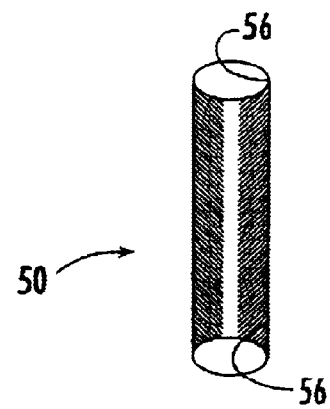
*FIG. 1.*
*FIG. 2.*
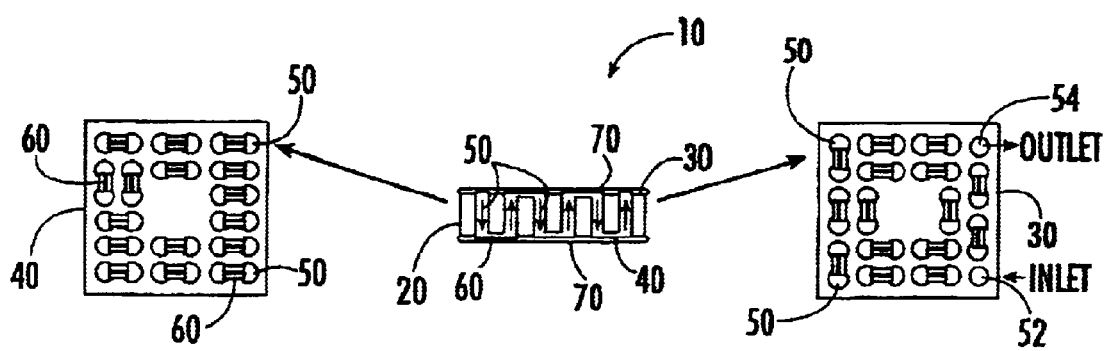
*FIG. 3.*

FOUR DIMENSIONAL BIOCHIP DESIGN FOR HIGH THROUGHPUT APPLICATIONS AND METHODS OF USING THE FOUR DIMENSIONAL BIOCHIP

BACKGROUND OF THE INVENTION

1. Field of the Invention

The present invention relates to a 4D biochip, methods for its use and methods for its production, wherein the 4D biochip provides high efficiency and high throughput testing.

2. Discussion of the Background

Large scale, multiple sample, parallel biochemistry assays, automated instruments, and system integration (instrument, databases and analytical tools) using the latest bioinformatics technologies are key factors for advancing the field of functional genomics. In recent years, DNA chip technology has been a focal point of genomic scientists and potential customers of genomics technology because of the ability of the DNA chip to assay a large number of genes in parallel. DNA chip technology can be used, for example, in gene expression assaying (parallel Northern blotting) to determine gene functions, in polymorphism detection and molecular marker genotyping (for example, SNP), to provide efficient genetic mapping, and, most importantly, in human disease diagnostics and in phenotype prediction for genetic manipulation of plants and animals. Further, the integration of DNA chip and protein characterization data is an important step in correlating the results of genomic and protemic studies.

There exist several DNA chips which are used to conduct multiple sample parallel bioassays. For example, U.S. Pat. Nos. 5,800,992 and 5,744,305 to Fodor et al. discloses an oligonucleotide-based chip (herein called the "Fodor chip") and U.S. Pat. No. 5,807,522 to Brown et al. discloses a cDNA-based microarray chip (herein called the "Brown chip"). Conventional biochips (the Fodor and Brown chips, and other two dimensional or surface-based biochips such as the Affymetrix type of biochip and the Stanford type of glass-slide microarray or Bio-Informatics Group's 3D biochip) are designed for parallel assays of a large number of bioelements (e.g. genes) for a single biosample (e.g. patients) or parallel assays of a single gene for a number of biosamples. For conventional biochips, data for different biosamples are usually generated at different times or under different experimental conditions. Experimental errors are the most common obstacles for the usefulness of the experiment because they prevent accurate comparison between the biosamples, which usually is the goal of the experiment.

The Fodor chip (U.S. Pat. Nos. 5,800,992 and 5,744,305) generally utilizes a flat silicon surface for in situ synthesis of the oligonucleotides on the chip surface using combinatory chemistry. The Fodor chip is typically limited to short oligonucleotide lengths, where the oligos have a small number (ie: 25) of nucleotide bases. The Fodor chip, therefore, may also be limited by experimental error associated with on-chip oligonucleotide synthesis and with short oligonucleotide hybridization error, which is generally associated with non-specific hybridization in a relaxed condition. Thus, due to these inherent experimental errors, techniques utilizing the Fodor chip may be prone to poor experimental repeatability. In addition, the Fodor chip may further be limited by slow hybridization rates due to the small effective hybridization area and random probe solution flow on the chip surface. In some instances, RNA amplification may also be required to increase the RNA concentration in the probe solution, which may make the Fodor chip unsuitable for certain applications. Thus, procedures involving the Fodor chip may be cost inefficient due to the complexities and limitations involved in producing the chip (labor intensive and time consuming), capturing the necessary images, and analyzing the collected data.

The Brown chip (U.S. Pat. No. 5,807,522) utilizes cDNA samples disposed in a microarray on the surface of a chip comprising a glass slide. The cDNA segments are typically chosen from cDNA libraries of EST sequencing projects. Each cDNA segment may range in length from several hundred to several thousand nucleotides. The nucleotide sequences in the cDNA segments are generally known, though cDNA segments without nucleotide sequence information and synthetic oligos may also be used in fabricating a Brown chip. The cDNA samples are usually delivered onto the chip using a robot having a three-dimensional motion control system and the ability to concurrently deposit multiple samples using a plurality of spotting pins. However, the Brown chip may also experience limitations such as, for example, error in the x-y positioning of the spotting pins by the robot and varying amounts of the cDNA samples deposited at each spot on the chip. In addition, hybridization error may be a limiting factor due to the small effective hybridization area on the chip and possibly due to secondary structure formed by single-strand oligonucleotides. Further, techniques using the Brown chip may be subject to extended hybridization times measured, for instance, in hours (for example, overnight hybridization). As with the Fodor chip, the Brown chip may also be difficult-to produce and may be limited in its practicality due to the limited surface area available on the chip.

Thus, the DNA samples reside on the surface of, for example, a glass slide or a silicon wafer according to both the Fodor and the Brown DNA chips. However, though the Fodor and Brown DNA chips are useful for some small-scale research in functional genomics, they are not suitable for future practical applications primarily due to high cost, time intensive fabrication of the DNA chip, and poor accuracy of experimental results. The poor accuracy of a surface-based biosample assay apparatus and method, for example, according to both Fodor and Brown, typically results from the low concentration of the complementary strands of DNA (or RNA) in the probe solution and the small effective hybridization area of the spots on surface-based chips. The biosamples are usually introduced to conventional biochips by hand or a robotic liquid handling instrument which is time consuming and subject to mistakes in the liquid handling. Further, the surface-based chips, such as the Brown chip, are often prepared using the robotic system for transferring biosamples from a mass solution to individual spots on a glass substrate to form the microarray. The biosample transfer may be accomplished, for example, by a robot operating at an overall rate of about four dots per second. Since a microarray may include, for instance, multiple thousands of individual samples, a microarray may be prone to lengthy formation times as well as possible contamination due to the robotic system.

The limited surface area and between sample variance for these conventional biochips points out a need in the art for a biochip based technology that can drastically increase the number of bioelements, the number of biosamples, or both being tested, and minimize between sample variances by allowing simultaneous testing of large numbers of biosamples.

BRIEF DESCRIPTION OF THE DRAWINGS

FIG. 1 is a perspective view of a 3D biochip.

FIG. 2 is a perspective view of a capillary defined in a 3D biochip.

FIG. 3 is a cross-sectional view of a 3D biochip.

SUMMARY OF THE INVENTION

Figure 4:
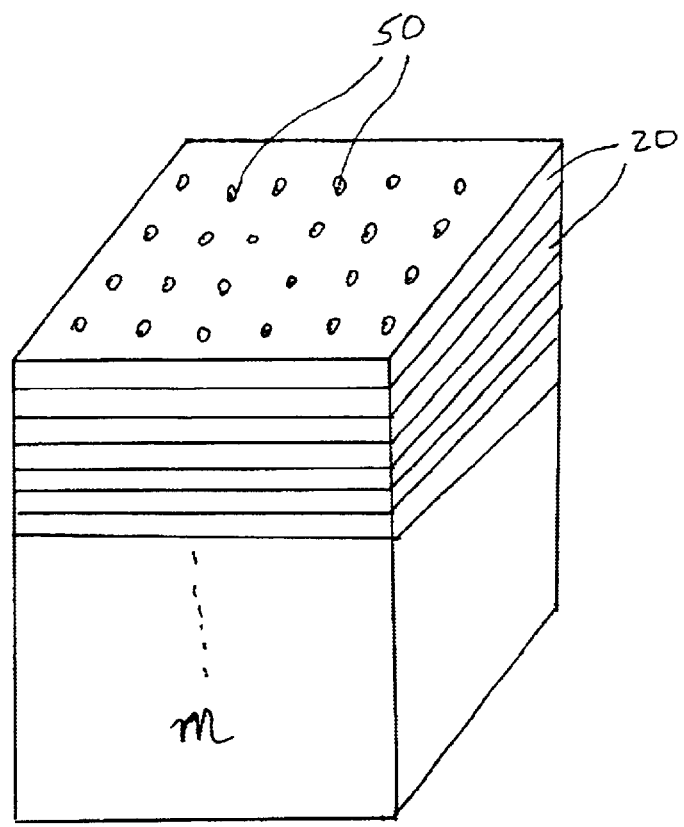
FIG. 4 is a perspective view of a 4D biochip or cube.

Accordingly, one object of the present invention is to provide a 4D biochip assembly that provides increased efficiency and throughput relative to conventional biochips.

A further object of the present invention is to provide a 4D biochip that can increase sample throughput by up to several orders of magnitude relative to conventional biochips.

A further object of the present invention is to provide a method for testing or assaying large numbers of samples simultaneously against the same bioelement or bioelements with high quality control.

A further object of the present invention is to provide a method for testing or assaying a sample or samples against large numbers of bioelements simultaneously.

A further object of the present invention is to provide a method for the rapid and efficient preparation of a 4D biochip of the present invention.

These and other objects of the present invention have been satisfied by-the discovery and development of an article comprising:

at least two plates, wherein each plate defines a plurality of cylindrical capillaries, each capillary having a pair of opposed ends, with at least one capillary comprising a reagent inlet and at least one capillary comprising a reagent outlet;

the plate further defining a plurality of channels oriented substantially perpendicularly to the capillaries and configured to selectively operably connect adjacent capillaries so as to form a continuous passage from the reagent inlet to the reagent outlet, the channels being further configured to direct the reagent into a capillary at one end thereof and from the capillary at the other end thereof such that the reagent flows through substantially the length of the capillary and serially through all of the capillaries defined by the plate; and wherein each of the at least two plates are positioned to substantially align the plurality of cylindrical capillaries between each pair of adjacent plates, and the use of this apparatus in high throughput, high efficiency screening methods.

In a further embodiment, the objects have been satisfied by the discovery and development of a 4D biochip, comprising:

m 3D biochip means, wherein m is an integer from 2 to 100,000 wherein each pair of adjacent 3D biochip means are operably connected by aligning capillaries present in one of said pair with capillaries present in the other of said pair.

DETAILED DESCRIPTION OF THE INVENTION

The present invention relates to a 4D biochip that overcomes many of the above-noted problems with prior biochip devices and assay systems by providing a means for performing a parallel assay with a large number of biosamples (e.g. patients) for a large number of bioelements in parallel. Such assays are termed herein "parallel-parallel assays". The throughput of a simple experiment using a 4D biochip of the present invention can be higher than the advanced conventional biochips by several orders of magnitude. In addition, the 4D biochip described herein can generate experimental data for multiple biosamples in parallel or at the same experimental time and same experimental conditions. The experimental errors for between biosample comparison are significantly reduced by using the present 4D biochip.

By performing parallel-parallel assays using the present 4D biochips, genotypes can be determined using, for example, traditional gel electrophoresis of PCR products of a target DNA fragment. Taq polymerase used in the PCR reaction is expensive. The present invention 4D biochip can also significantly reduce the amount of reagent use on a per datapoint basis.

The 4D biochip of the present invention can use biosamples directly from microtiter plates with standard formats, e.g., 96-well dishes, if desired, and therefore, no additional liquid handling is needed once the biosamples are processed. Alternatively, the 4D biochip of the present invention can use biosamples delivered by a robotic system conventionally used in traditional biochips, biosamples delivered by hand, or biosamples delivered using any conventional delivery system.

The 4D biochip of the present invention also provides advantageous information flow from biochip design and production to assay and data collection and analyses for relatively large experiments. For example, an experiment involving 1,000 conventional biochips is not unusual. Errors associated with the information flow could potentially result in no or false conclusions. Because of the parallel-parallel nature of the 4D biochip, the information flow can be implemented in a much more simple and systematic way.

The 4D biochip described herein significantly facilitates high throughput screening for drug development and all other genomic and proteomic based research and applications by enabling the processing of large numbers of biosamples (e.g., patients, suspects, antigens, etc.) for a large number of biological factors (e.g., genes, mutations, SNPs, proteins, antibodies, etc.) precisely in a timely and cost effect manner. For example, assaying a single 4D biochip can generate genotypes of 1,536 patients for 1,000 genes using one thousand 1,536-feature 3D biochips to form the 4D biochip. A 4D biochip with the same physical format and different biological format can generate genotypes of 96 patients for 16,000 genes. As another example, assaying using a single 4D biochip can generate interactions among 1,000 antibodies and 1,536 antigens or among 16,000 antibodies and 96 antigens.

The 4D biochip of the present invention provides the ability to obtain high throughput, high efficiency screening of samples. Additionally, the production of the 4D biochip of the present invention provides improvements in both efficiency of production and quality control, relative to conventional single chip methods. In particular, conventional surface-based biochips are produced individually, one at a time. This has the effect of giving a low production yield, since fabrication of 40 glass slides may take up to several days, even using automated robotic based production. A more significant problem with such production is the difficulty in implementing an effective quality control program, since conditions can vary signficantly over those several days. Accordingly, for traditional biochips, the quality of a single biochip does not represent the quality of the batch of biochips in which it was produced. Thus, the failure rate of conventional biochips when tested for quality control can be significant.

The individual 3D components of the 4D biochips of the present invention, on the other hand, can be fabricated in large quantities, typically in lots of one thousand. These 3D components of the present invention 4D biochips are nearly identical providing significant improvements in quality control and even allowing the use of a portion of the chips for establishment of rigorous quality control measures without an appreciable effect on production efficiency.

Unless defined otherwise, all technical and scientific terms and any acronyms used herein have the same meanings as commonly understood by one of ordinary skill in the art in the field of the invention. Although any methods and materials similar or equivalent to those described herein can be used in the practice of the present invention, the preferred methods, devices, and materials are described herein.

All patents and publications mentioned herein are incorporated herein by reference to the extent allowed by law for the purpose of describing and disclosing the proteins, enzymes, vectors, host cells, and methodologies reported therein that might be used with the present invention. However, nothing herein is to be construed as an admission that the invention is not entitled to antedate such disclosure by virtue of prior invention.

The 4D biochip of the present invention comprises an assembly of two or more 3D biochips, such as those described in WO 01/26799A1, incorporated herein by reference. In WO 01/26799 A1, a 3D biochip is defined as a channeled capillary array or a bundle of vertical cylinders connected by microchannels on a substrate FIGS. 1–3 disclose an embodiment of this 3D biochip for conducting multiple sample, parallel bioassays, indicated generally by the numeral 10, which includes the features of the present invention. The biochip 10 generally comprises a plate 20 having an upper surface 30 and a lower surface 40, a plurality of capillaries 50 defined by the plate 20, and a plurality of channels 60 selectively and operably connecting adjacent capillaries 50. Within the context of the present invention, the term "substantially align" is used when referring to capillaries on adjacent biochip plates, and indicates that the capillaries are placed in sufficient alignment to permit passage of sample from one capillary to the other.

In one embodiment, the plate 20 is, for instance, about one centimeter wide by one centimeter long by one-half millimeter thick. Further, the capillaries 50 have, for example, an inner diameter of about 20 microns with about 80 micron spaces between adjacent capillaries 50 such that up to 10,000 capillaries 50 may be fabricated in one biochip 10. The capillaries 50 are generally disposed about the plate 20 in an array, though many different configurations may also be used. Accordingly, it will be understand that the dimensions and configurations of the plate 20 and the capillaries 50 may vary widely. For instance, the plate 20 according to one embodiment of the invention may be on the order of approximately ten centimeters wide by ten centimeters long by three millimeters thick. In addition, the capillaries 50 may vary, for example, between about 5 microns and about 1000 microns in diameter.

As shown in FIG. 2, the capillaries 50 further generally increase the effective hybridization surface area of the biochip 10 compared to surface-based biochips using samples comprising a spot on a flat surface. For instance, for a capillary 50 having a diameter equal to the diameter of the spot, the capillary 50 provides a hybridization surface area advantage equal to the ratio of four times the height of the capillary 50 to the diameter of the spot. Thus, for a one-half millimeter thick plate 20 (500 microns) and a 20 micron capillary diameter, the capillary 50 provides about 100 times the hybridization surface area as compared to a 20 micron diameter spot on a surface-based biochip. A larger hybridization area provides a stronger hybridization signal, increases the hybridization rate, and tends to indicate less false hybridization. In addition, the larger hybridization area tends to reduce the likelihood of secondary structure disturbance since the chance of DNA molecules forming secondary structure is inversely proportional to the hybridization surface area. Thus, for the above example, the channeled capillary array biochip 10 would be 100 times less likely to experience DNA secondary structure disturbance than a surface-based biochip.

Where the biochip 10 includes a high density of capillaries 50, the plate 20 is comprised of a semiconductor material such as, for example, silicon. A silicon biochip 10 uses, for instance, common semiconductor photolithography and etching processes to form the capillaries 50 in the plate 20. More particularly, a layer of a photosensitive polymer (not shown) is deposited on a surface of the plate 20 and patterned to define a plurality of holes therein corresponding in the size and distribution to the desired capillaries 50. The patterned layer thus comprises a mask (not shown) for forming the capillaries 50. Once the mask is formed, the silicon plate 20 is etched through the holes in the mask to form the plurality of capillaries 50. Production of a high density biochip 10 is facilitated by using silicon processed by semiconductor fabrication techniques since much greater precision on a smaller scale may thereby be obtained. However, where a low or medium density biochip 10 is required, the biochip 10 may be comprised of a plastic or other polymer material. Where a plastic material is used to form the biochip 10, a mold is prepared such that the plastic may be, for instance, injection molded to form the plate 20.

As shown in FIGS. 1 and 3, the capillaries 50 are generally symmetrically and evenly disposed about the plate 20 and extend from the upper surface 30 to the lower surface 40 thereof. Lateral channels 60 are further formed in the plate 20 to selectively operably connect adjacent capillaries 50 about both the upper surface 30 and the lower surface 40. Note that the orientation-related references used herein, such as "upper," "lower," and "lateral," are used for example only in reference to the corresponding figures. It will be understood that the 3D biochip according to embodiments of the invention may be configured in many different orientations wherein such a reference frame may not be applicable. Preferably, the capillaries 50 are each connected to one adjacent capillary 50 on the upper surface 30 by a channel 60 and to a different capillary 50 on the lower surface 40 by another channel 60. Most preferably, the channels 60 operably connect adjacent capillaries 50 such that a single continuous passage is formed between at least one reagent inlet capillary 52 and at least one reagent outlet capillary 54. Thus, for a fluid or reagent probe solution flowing through the passage, the fluid would be directed along the length of the reagent inlet capillary 52, through a channel 60 on the lower surface 40 to an adjacent capillary 50, and then along the length of that capillary 50 before being directed through still another channel 60 on the upper surface 30 to another adjacent capillary 50. This process continues until the fluid is directed serially through all of the capillaries 50 and along the length of the reagent outlet capillary 54.

According to one embodiment of the present invention, as shown in FIG. 3, the plate 20 may be formed such that the channels 60 operably connecting adjacent capillaries 50 on both the upper surface 30 and the lower surface 40 are open with respect to the upper and lower surfaces 30 and 40. The open upper surface 30 and lower surface 40 permit access to the capillaries 50 and facilitate immobilization of the biosample on the inner walls 56 of the capillaries 50. Once the plate 20 has been prepared with the biosample such that the biosample is adhered to the walls 56 of the capillaries 50, the upper surface 30 and the lower surface 40 are each sealed, for example, by a glass plate 70. The glass plates 70 seal the upper surface 30 and the lower surface 40 of the plate 20 such that the ends of the capillaries 50 are sealed and any fluid flowing through the capillary 50 is directed into and out of the capillary 50 by the channels 60. Accordingly, a fluid, such as the probe solution, is able to flow from the reagent inlet capillary 52 to the reagent outlet capillary 54 along a continuous passage between adjacent capillaries 50, and serially through each capillary 50 in the plate 20, to the reagent outlet capillary 54. Appropriate mechanisms (not shown) are preferably provided in the glass plate 70 sealed to the upper surface 30 (or lower surface 40) of the plate 20 to allow the flow of a reagent probe solution through the glass plate 70 into the reagent inlet capillary 52 and from the reagent outlet capillary 54.

According to some embodiments of the present invention, the reagent probe solution flow originates from and returns to a hybridization chamber (not shown) connected to the reagent inlet capillary 52 and the reagent outlet capillary 54, thereby forming a closed system for a flow of the reagent. Having a closed reagent flow system generally permits a lower quantity of the reagent solution to be used compared to surface-based biochips. For example, a maximum RNA concentration can be attained with 0.1 microliters of a reagent probe solution. In contrast, the Brown chip requires more than 10 microliters of the reagent solution to carry out the hybridization reactions using a surface-based biochip configuration.

High density 3D biochips may be made of a semiconductor material such as, for instance, silicon, which thereby allows semiconductor fabrication techniques to be applied to form the capillaries and channels as described for example in WO 01/26799 A1.

As noted above, within the context of the present invention, a 4D biochip is defined as an assembly of interconnected 3D biochips as shown in FIG. 4, where m 3D Biochips 20 are aligned with each other. The number of 3D biochips (m) will vary depending on specific applications with, for example, each of the 3D biochips embedded with one specific bioelement (e.g. probe, peptide, antibody ...) for all features (e.g. n features). This 4D assembly has potential to assay n biological samples (e.g. human, antigen, ...) for m bioelements (e.g. genes, proteins, antibodies, ...), wherein n is from 1–100,000, preferably from 10–5,000, more preferably from 100–3,000, and m is from 1–100,000, preferably from 10–5,000, more preferably from 100–3,000, such that n and m cannot both be 1 at the same time. The 4D assembly of the present invention can take on a variety of physical shapes and forms, with the most common being a rectilinear solid, preferably in the form of a cube prepared by combining the 3D biochips in a stacked array. Of course, depending on the shape of the 3D biochip, the resulting 4D assembly can have any final shape, so long as the 3D biochips are interconnected as described herein.

The present invention 4D biochip can also be composed with a number m of 3D biochips each embedded with n different bioelements. The resulting 4D biochip has the potential to assay one biological sample (e.g. a patient) for n×m bioelements (e.g. genes or SNPs).

The 4D biochips of the present invention can be used individually, or can be grouped into a larger assembly containing a plurality of 4D biochips. Such a "superassembly" of biochips could be used to further increase the throughput, or to further increase the number of bioelements tested per sample. Such a "superassembly" could be used in large scale screening operations to screen larger numbers of samples relatively simultaneously. This could be used to replace the conventional expensive laboratory automated screening facilities used by most of the pharmaceutical industry.

For most applications, the design of the 4D biochips will fall in between the two extreme cases, which is further described herein.

An embodiment of the 4D biochip of the present invention with n features (cylinders 50) is depicted in FIG. 4. One element, for example, DNA probe, peptide, antibody, etc., is attached to the inside walls of all n cylinders (see WO 01/26799 A1). Thereafter, m biochips, each coated with a unique element can be stacked into an assembly, the assembly therefore containing m elements.

To implement the 4D biochip, two instrument capabilities are needed. One instrument capability is to embed bioelements onto a sufficient number of 3D biochips and the other is to assay the 4D biochip. Of course, the two instrument capabilities can be in separate instruments or combined into a single instrument capable of performing both functions.

Due to the relatively small sizes of the capillaries 50 and the channels 60 and the small amount of the reagent probe solution used during the hybridization process, precise control over the flow rate of the reagent probe solution is desirable. The reagent probe solution can be "pumped" through the capillary 50. This may be accomplished using electrostatic pressure generated by a voltage applied across the two ends of a capillary 50. Generally, high voltage of, for example, 1–20 kV is required to generate the necessary pressure. By using electrostatic pressure to pump the reagent probe solution through the continuous passage formed by the capillaries 50 and the channels 60, the voltage may be readily reversed such that the system is capable of pumping the reagent probe solution in the opposite direction. Alternating directions of the reagent probe solution flow may thereby allow a more complete and faster hybridization process compared to surface-based biochips. For example, several reversals of reagent flow may be necessary to obtain complete hybridization. The movement of molecules by the application of a plurality of electrical fields is further described in U.S. Pat. No. 5,126,022 to Soane et al., the contents of which are herein incorporated by reference.

Of course, it may be desirable to arrange the various 3D biochips in a particular arrangement such that as the sample passes through the individual capillary in one 3D biochip into the capillary in the adjacent 3D biochip, the possibility of sequential interactions (selective hybridizations, selective removal of sample components) can occur. In such a case, the sample would be most desired to pass through the 4D biochip in a single direction, instead of the above-described alternating flow directions.

When preparing the 4D biochip of the present invention, the 3D biochips are attached to one another, in a stacked array as described above, using any of a variety of methods of maintaining plate to plate contact while maintaining alignment between capillaries on adjacent plate faces. This can be accomplished by using mechanical guides for the 3D biochip plates to hold them in place, or by using an adhesive or glue means. Of course, if adhesive or glue means is used, it is necessary to carefully apply the adhesive or glue to avoid plugging one or more capillaries. The adhesive or glue means can be any conventional adhesive or glue that is compatible with the material of the 3D biochip and will maintain the bond between adjacent 3D biochips in the assembly. The mechanical guides that can be used in one embodiment of the present invention can include external guides that align the 3D biochips with one another, or can be internal guides or pins which pass through the stacked array of 3D biochips. Alternatively, both external and internal guides can be used, such as a combination of a plurality of pins, preferably 3-5 pins arranged through the individual plate, along with a shell or box around the outer perimeter of the assembled 4D biochip. The outer shell or box can be made of any desired material, preferably of metal, plastic or glass, so long as it does not interact or interfere with the samples or bioelements contained in the 4D biochip assemble. As an alternative embodiment, the 3D biochips can be prepared such that one side contains indentations, while the other side contains protrusions, such that upon stacking two or more 3D biochips, the protrusions from one 3D biochip fit into the indentations of the adjacent 3D biochip.

According to chemical kinetics, the total number of collisions between the DNA fragments in the biosample and the complementary strand in the probe solution is a function of the hybridization area, the concentration of the complementary strand in the probe solution, and the velocity of the DNA molecules in the probe solution. Thus, control of the flow rate of the probe solution is advantageous compared to the random flow used by surface-based biochips. The use of small diameter capillaries 50 with controlled flow of the probe solution further increases effective concentration of the complementary RNA strands. In one embodiment, for example, the effective concentration of the RNA strands in the probe solution may be up to 300,000 times greater than a comparable surface-based biochip. Thus, control of the probe solution flow and the higher effective hybridization area provides more complete hybridization, with a higher hybridization rate, and reduces the amount of the probe solution required to perform the assay. In one embodiment, for example, the-time necessary to complete a hybridization procedure may be on the order of minutes as compared to hours of hybridization time that may be required for surface-based biochips.

In another embodiment, a volume reducing liquid assayer, as described in WO 01/26798 A1, which is incorporated herein by reference, can be employed to deliver the biosamples to the 4D biochip having n features and m biochips. By controlling fluids between the delivery device and the 4D biochip device, the m elements are assayed for n biological samples. This can facilitate high throughput screening for a number of samples. Each 4D biochip will generate n×m data points, e.g., n×m=1536×1000=1,536,000 data points. In one embodiment, the 4D biochip with or without the delivery device described above, can be useful for efficiently screening clinical diagnostic genes or markers (m genes or markers) for n patients.

Figure 5:
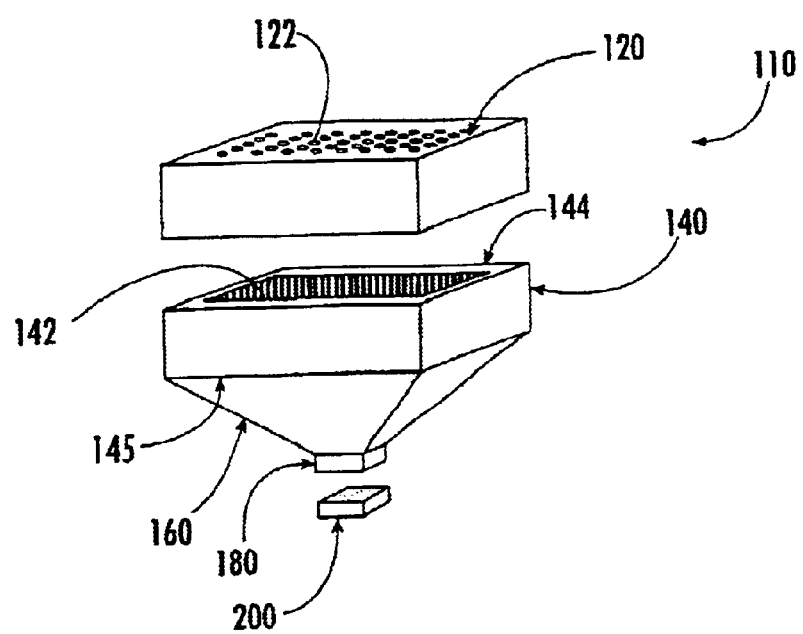
FIG. 5 is a perspective view of a volume-reducing arrayer for depositing a predetermined amount of a liquid on a substrate according to one embodiment of the present invention.
Figure 6:
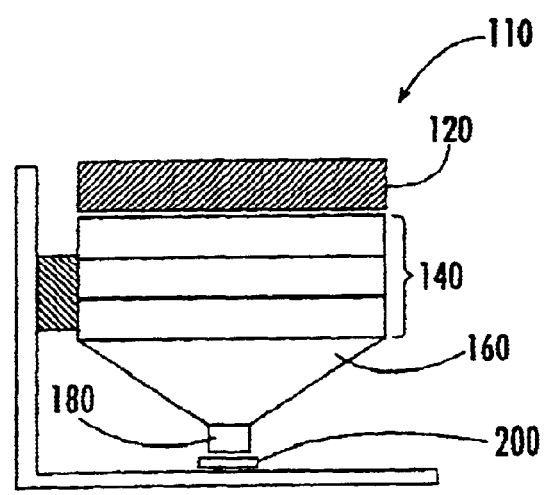
FIG. 6 is a side elevation of a volume-reducing arrayer for depositing a predetermined amount of a liquid on a substrate according to an alternate embodiment of the present invention.

The volume-reducing liquid arrayer is depicted in FIGS. 5, 6, 7A, 7B, 8A, and 8B. FIGS. 5 and 6 disclose embodiments of a volume-reducing arrayer apparatus adapted to deliver a predetermined amount of a liquid solution to a substrate, the arrayer apparatus (also referred to herein as an "arrayer") being indicated generally by the numeral 110 and including the features of the present invention. The arrayer 110 generally comprises a reservoir 120, at least one arrayer block 140, a flow control device 160, and a stamper head 180 cooperating to deliver biosamples in the form of a liquid to a biochip 200.

In one embodiment of the arrayer, the reservoir 120 comprises, for example, a microtiter plate constructed so as to store bulk DNA solutions therein. More particularly, for example, a 20 cm×20 cm microtiter plate may contain a plurality of wells 122 arranged in an array, where each well 122 is capable of holding 5 to 200 microliters of a DNA solution. Thus, according to current technology, such a microtiter plate may, for example, hold as many as 10,000 DNA samples therein and may theoretically be used to fabricate approximately 5,000 to 10,000 separate biochips 200.

Underlying the reservoir 120, according to one advantageous embodiment, is at least one arrayer block 140, in the form of a plate, defining at least one and, in some instances, a plurality of arrayer capillaries 142. The arrayer capillaries 142 may be arranged in an array corresponding to the array of wells 122 in the reservoir 120. The wells 122 in the reservoir 120 may each have a valve (not shown) for controlling the flow of the liquid solution, and thus the biosamples, from the wells 122 into the corresponding arrayer capillaries 142 in the arrayer block 140. It is understood, however, that delivery of the solution from the wells 122 to the arrayer capillaries 142 may be accomplished by other delivery methods, wherein the reservoir 120 is in communication with, but not necessarily disposed atop, the arrayer block 140, consistent with the spirit and scope of the present invention.

A typical biochip 200 has a surface area on the order of, for example, about one square centimeter to about four square centimeters and requires microscopically-sized samples to form the necessary oligonucleotide probes on the biochip 200. The typical biochip 200, although shown as a square shaped device, can optionally take on any desired shape, including but not limited to, circular, oval, polygonal, etc. The liquid solution (also referred to herein as the "biosamples") released from the wells 122 must be reduced with respect to both the volume of the individual biosample as well as the area occupied by the well array 122.

Figures 7A, 7B:
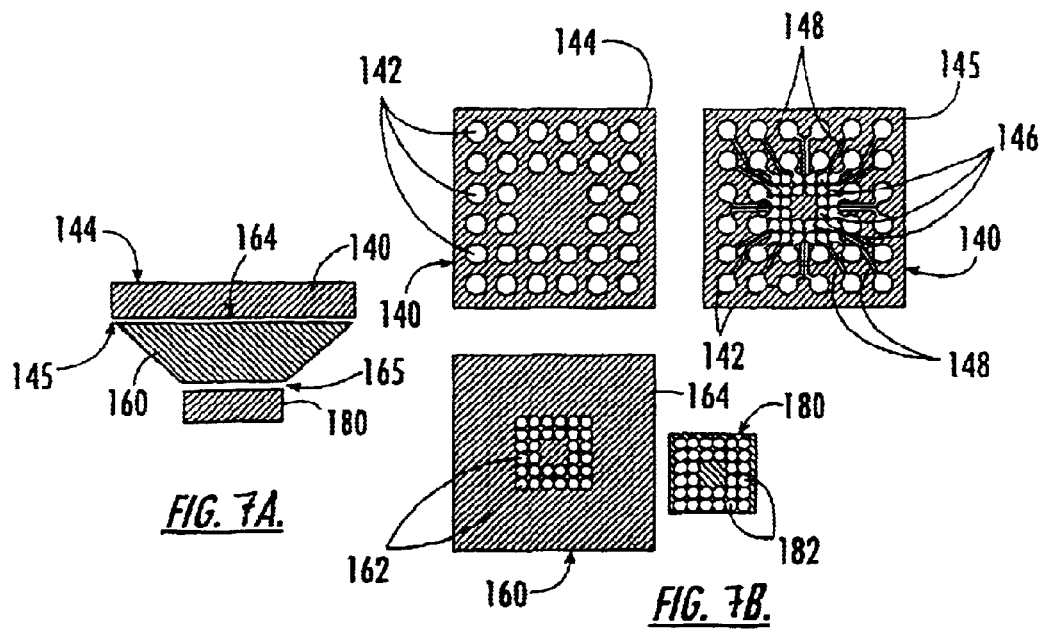
FIG. 7A is a schematic of a volume-reducing liquid arrayer for depositing a predetermined amount of a liquid on a substrate according to one embodiment of the present invention.
FIG. 7B shows top and bottom views of each plate comprising a volume-reducing arrayer according to the embodiment of the present invention shown in FIG. 3A.

The arrayer block 140 is thus configured to receive and reduce the volume of the biosamples from the reservoir 120 and to reduce the area occupied-by the well array 122. As shown in FIGS. 7A and 7B, the arrayer block 140 is typically a flat plate having an upper surface 144 and a lower surface 145 and is sealed and adhered to the reservoir 120 by a thin film of silicon. The arrayer capillaries 142 defined by the arrayer block 140 are arranged in an array corresponding to the well array 122 in the reservoir 120 and each arrayer capillary 142 may extend, in some instances, from the upper surface 144 to the lower surface 145 of the arrayer block 140. At the lower surface 144 of the arrayer block 140, an array of indentations 146 is formed, wherein the indentation array 146 corresponds to at least a portion of the arrayer capillary array 142. In order to reduce the area occupied by the arrayer capillary array 142, the indentation array 146 is typically formed, for instance, toward the center of the arrayer block 140 and inwardly of at least some of the arrayer capillaries 142, though a variety of different configuration may be used in accordance with the spirit and scope of the present invention. A plurality of channels 148 are also formed in the lower surface 145 of the arrayer block 140, with each channel 148 extending between an arrayer capillary 142 and a corresponding indentation in the indentation array 146. As shown in FIGS. 7A, 7B, 8A and 8B, the reduction in the arrayer capillary array 142 area may be accomplished with a single arrayer block 140, wherein the entire arrayer capillary array 142 is reduced in area to the size of the indentation array 146 by the single arrayer block 140.

Figures 8A, 8B:
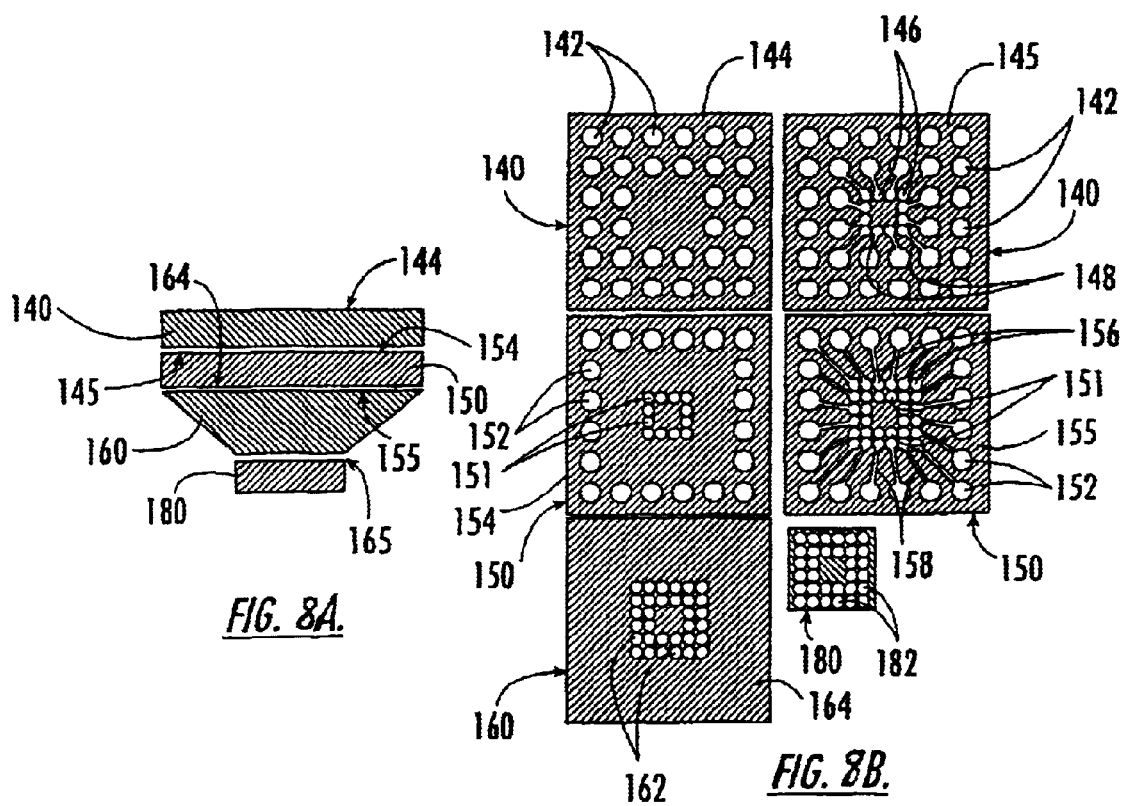
FIG. 8A is a schematic of a volume-reducing arrayer for depositing a predetermined amount of a liquid on a substrate according to an alternate embodiment of the present invention.
FIG. 8B shows top and bottom views of the plates comprising a volume-reducing arrayer according to the embodiment of the present invention shown in FIG. 4A.

As shown in FIGS. 8A and 8B, reducing the arrayer capillary array 142 area may be alternatively accomplished with multiple arrayer blocks, wherein a first arrayer block 140 and a second arrayer block 150 are shown in this embodiment, and wherein each successive arrayer block reduces the area occupied by a particular subset of the first arrayer capillary array 142. For example, the second arrayer block 150 may be disposed below the first arrayer block 140 such that the lower surface 145 of the first arrayer block 140 is sealed by the upper surface 154 of the second arrayer block 150. The upper surface 154 of the second arrayer block 150 seals the first arrayer capillaries 142 in the first arrayer block 140 having channels 148 connected thereto, such that each first arrayer capillary 142 having a connected channel 148, and that corresponding channel 148, are sealed. Accordingly, any portion of the solution flowing through the first arrayer capillary 142 flows through the channel 148 to the corresponding indentation 146.

The second arrayer block 150 further defines a plurality of second arrayer capillaries 151 therein corresponding to the array of indentations 146 in the first arrayer block 140. The second arrayer capillaries 151 typically extend through the second arrayer block 150 from the upper surface 154 to the lower surface 155 thereof. In order to reduce the volume of the biosample solution in each capillary, the second arrayer capillaries 151 in the second arrayer block 150 are configured to have a smaller diameter than the first arrayer capillaries 142 in the first arrayer block 140. For example, in one embodiment of the present invention, the first arrayer capillaries 142 of the first arrayer block 140 have a diameter of between about one millimeter and about two millimeters while the second arrayer capillaries 151 in the second arrayer block 150 have a diameter of between about 50 microns and about 200 microns. The smaller diameter of the second arrayer capillaries 151 in the second arrayer block 150 reduces the volume per unit length of the solution in the capillary and provides more accurate and easier regulated volumetric control over the flow of the biosample solution from the reservoir 120 to the biochip 200. Thus, it will be understood that, by reducing the dimensions and the spacing of subsequent sets of capillaries, the volume of the individual biosample as well as the area occupied by the corresponding capillary array are accordingly reduced in order to scale-the biosamples to the dimensions of the corresponding biochip according to the spirit and scope of the present invention.

In some instances, the first arrayer block 140 may have first arrayer capillaries 142 which are not connected to channels 148 at the lower surface 145 of the first arrayer block 140. In those instances, the second plate 150 also defines a plurality of continuation capillaries 152 corresponding to the unchanneled first arrayer capillaries 142 of the first arrayer block 140 and being configured to have a substantially similar diameter with respect thereto. Accordingly, when the first arrayer block 140 is engaged with the second arrayer block 150, some of the first arrayer capillaries 142 continue through the first arrayer block 140 to the corresponding continuation capillaries 152 in the second arrayer block 150. Where the second arrayer block 150 continues some of the first arrayer capillaries 142 of the first arrayer block 140 with continuation capillaries 152, the second arrayer block 150 also includes channels 158 defined in the lower surface 155 thereof, with the channels 158 leading to an array of corresponding indentations 156 also defined by the lower surface 155 of the second arrayer block 150. In such instances, the second arrayer block 150 completes the reduction of the area of the original capillary array 142. It is understood, however, that the reduction in the area of the capillary array may be accomplished by various methods consistent with the spirit and scope of the present invention. The various methods of reducing the area of the capillary array will be applicable herein with respect to the described embodiments in addition to or in the alternative to the specific configuration described.

Once the capillary array 142 has been reduced to the desired area and the individual biosamples have been reduced to the desired volume, a flow control 160 is operably connected to the lower surface 155 of the last arrayer block 150. The flow-control device 160 may include, for example, an array of flow control capillaries 162 corresponding to the previous reduced area capillary array formed by the arrayer blocks. The flow control device 160 is configured to control the flow of the biosamples through the flow control capillaries 162 and may take the form of, for instance, a valve, a pump, or the like.

The movement of molecules by the application of a plurality of electrical fields is further described in U.S. Pat. No. 5,126,022 to Soane et al., the contents of which are herein incorporated by reference. However, flow control of the biosamples as mentioned herein may also be accomplished, for instance, with an external pump interfaced with the arrayer apparatus 110 for pumping the biosamples through the capillaries, instead of using an electrostatic pump configured as previously described. Alternatively, for example, an external valve may be engaged with the arrayer apparatus 110, for controlling the flow of the biosamples. Thus, it will be understood that flow control of the biosamples may be achieved in many different manners, in addition to that described, according to spirit and scope of the present invention.

Another advantageous aspect of a volume-reducing arrayer apparatus according to the present invention comprises a method of fabricating a volume-reducing arrayer apparatus adapted to deliver a predetermined amount of a liquid solution from a reservoir to a substrate as described in WO 01/26798.

Figure 9:
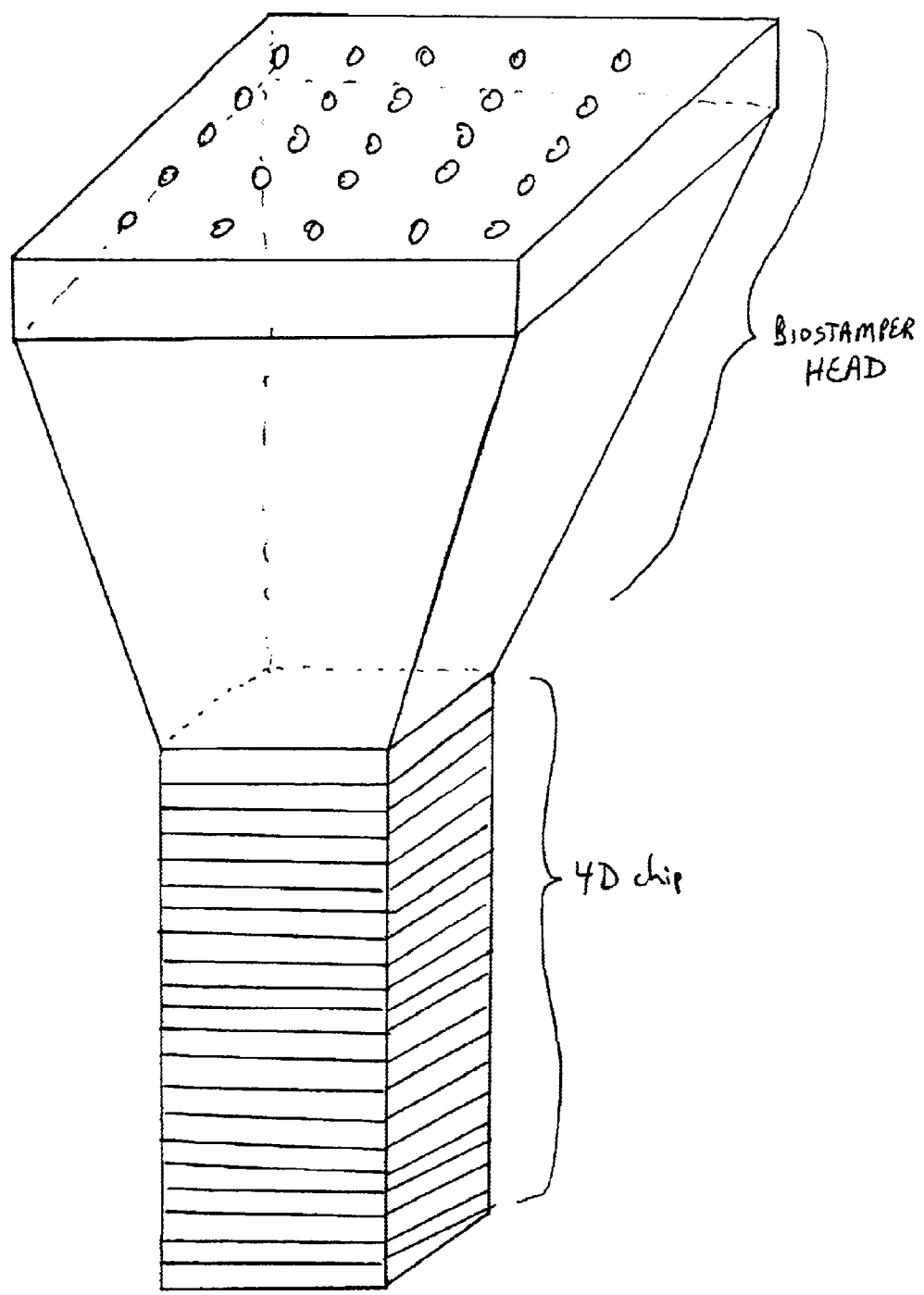
FIG. 9 is a perspective view of a volume-reducing arrayer positioned on a 4D biochip.

Bioelements (e.g. DNA probes) in the reservoirs 120 are deposited into the cylinders of biochip 200 through channels connecting the reservoirs 120 to the corresponding cylinders on the biochip 200. If a 4D biochip of the present invention (see FIGS. 4 and 9) composed of m 3D biochips replaces the single 3D biochip 200, then a single operation (or stampings) will deposit all n bioelements onto all m 3D biochips.

By taking one 3D biochip from each of the m stampings, a 4D biochip is assembled with m 3D biochips. Biochips from the m stampings will assemble m 4D biochips. The arrayer can be used for assaying the 4D biochip by placing the cube in the place of biochip 200 and filling the reservoirs 120 with biosamples.

Figure 10:
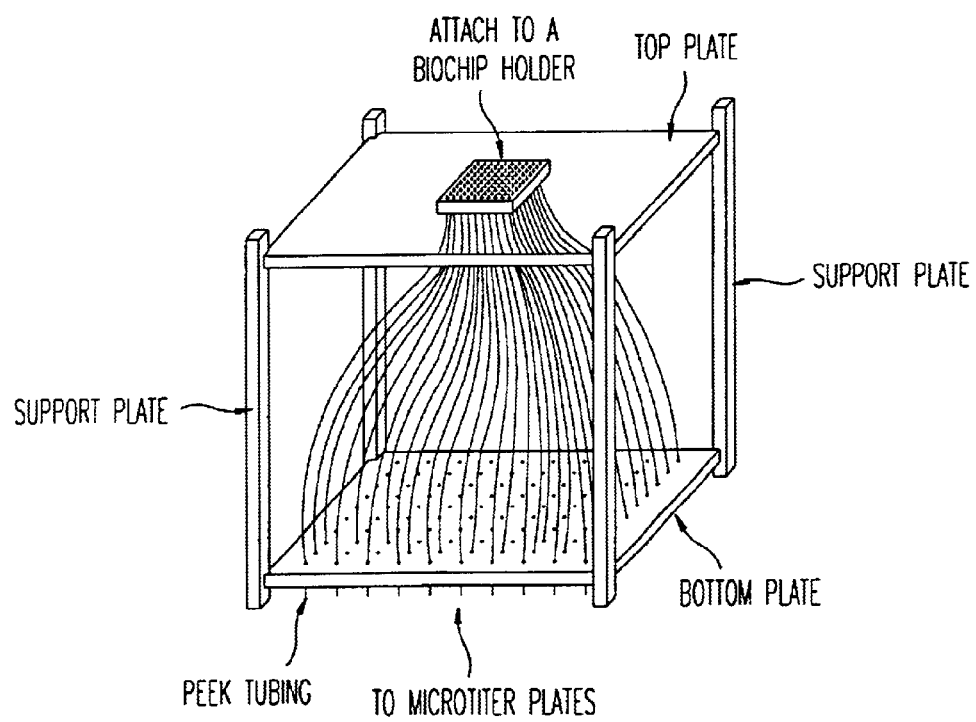
FIG. 10 is a perspective view of the delivery of probes onto a 3D biochip/4D biochip with parallel tubing.
Figure 11:
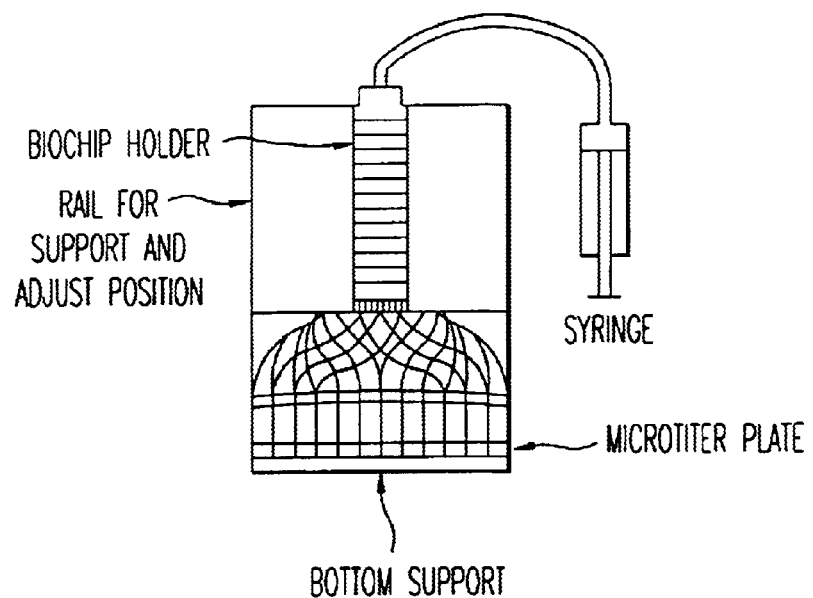
FIG. 11 is a perspective view of delivery of reagents, probes and/or test samples with a syringe.

For reducing liquid handling and simplifying the biostamper instrument, the plate 110 (FIGS. 5–8B) can be replaced with a standard micro titer plate (96-well or 384-well or 1536-well) and the connecting channels 48 (FIGS. 7A/B and 8A/B) can be replaced with standard tubing (e.g. peek tubing) (FIG. 10). The reservoir 120 is now replaced with well of the microtiter plate. Instruments from the tubing approach can be used for both embedding the 3D biochips and assaying the 4D biochip. Bioelements for coating the biochips or biosamples for assaying the biochips can be placed in the wells of the microtiter plate (or plates). By connecting to a syringe pump to the top of the 4D biochip, bioelements or biosamples (in liquid form) can be drawn into the cylinders of the biochips for coating or assaying. (FIG. 11) whereby the 4D biochip is held in place by a biochip holder, which holder is placed directly above a microtiter plate having n wells containing biological probes or samples as accordingly required. The biochip holder can hold a large number of biochips, e.g., up to 100,000, each coated with different probes, antibodies or antigens. Upon drawing the fluids upwards with, for example, a syringe, the samples or probes will be drawn into the m biochips in the biochip holder. This delivery method can be used to coat the biochips with probes or can be used to deliver the samples to be assayed. Alternative methods of providing a mechanism for moving reagent solutions may include vacuum or electric charge as described herein.

Figure 12:
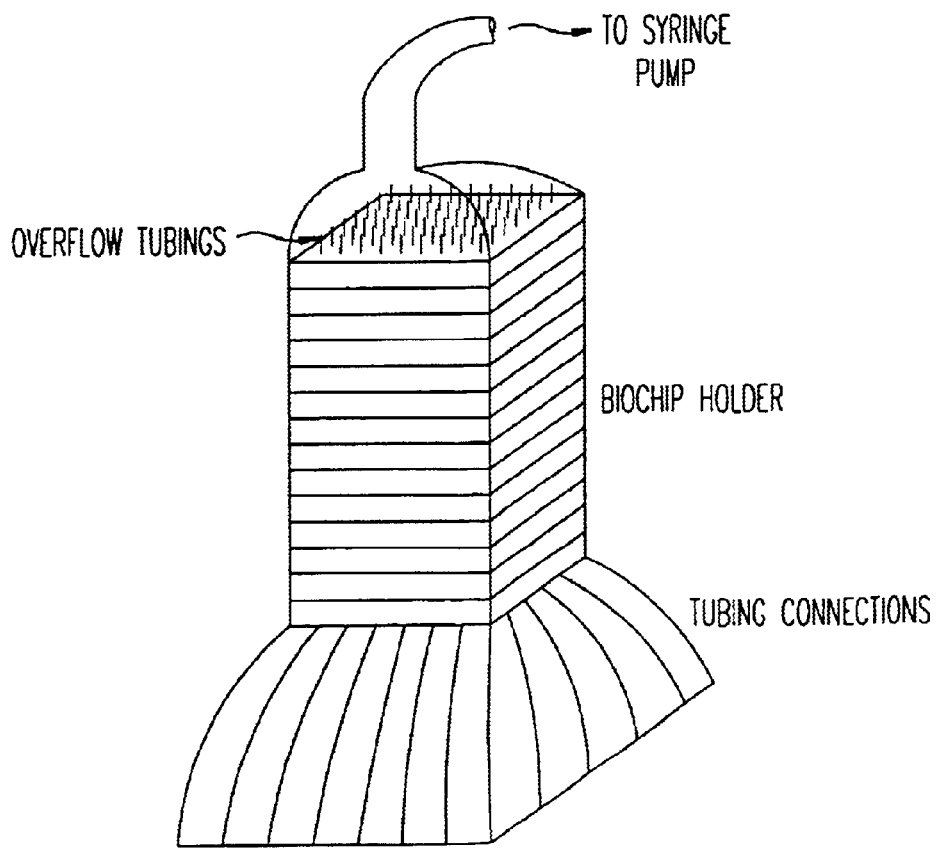
FIG. 12 is a perspective view the positions of overflow tubing in a biochip delivery apparatus.

To prevent contamination due to potential overflow, tubing extension on the top the biochip holder can be installed (FIG. 12). Overflow tubings are pressure fitted in the top tier of the 3D biochip holder. Reagent flow in each of the features can visually check or by automatic image analysis using a CCD camera. The overflow of the reagents (or probes, human samples, or others) will not contaminate each other.

To implement the 4D biochips, two major steps are involved. Step 1 is to stamp a sufficient number of 3D biochips with target bioelements (e.g. DNA probes) and assemble them into the 4D biochip. The other step is to assay the assembled 4D biochips using biosamples containing the experimental targets (e.g. mutations, SNPs, genes, proteins, DNA transcripts or RNAs, etc.). For a given experiment with certain numbers of targets (e.g. genes) and biosamples (e.g. patients) and formats of the 3D biochips (e.g. number of features and the correspondence between the features and the standard format of the microtiter plates), there is an optimum design for implementing the experiment using the 4D biochip.

An example of preparing a 4D biochip design for 384-feature biochips having a format corresponding to the format of 4 standard 96-well microtiter plates is provided below. The procedures described can be readily adapted by those of ordinary skill to use for other arrangements.

For an arrangement of a 384-feature 3D Biochip for a parallel-parallel assay in a 4D Biochip, the biochip can preferably be composed of 4 regions, preferably equal in size, each having 96 capillary channels thereby having 96 features per quadrant. In such a 384-feature biochip, there are numerous arrangements for coating and assaying the biochips. For example, 4 different probes coated on the chip with 96 replications. The 96 replications more preferably correspond to the geometry of a 96-well microtiter plate. This arrangement will allow assaying 96 bio-samples in parallel. If a 4D Biochip with 1,000 3D biochips (having 384-features as described) is employed, then the 4D biochip has the potential for assaying 96 biosamples for 4×1000=4,000 genes or other types of elements thereby generating 96×4×1,000=384,000 data points.

The arrangement of a 4D biochip can be very flexible to meet the needs of certain applications. In some applications, extreme distributions of samples or probes can be used, for example, where all 384 features are different or where all 384 features are the same. Where all 384 features are different, a 4D biochip made of 1000 3D biochips has the potential of assaying 1 biosample for 384,000 genes or other types of elements, which could be of particular practical use for screening an individual for various disease related genes. Where all 384 features are the same, a 4D biochip made from 1000 3D biochips can be used to assay 384 biosamples for 1,000 genes and generating 384×1000=384,000 data points.

An arrangement for assaying, for example, whole human genome samples, using a 4D biochip of the present invention is illustrated below. In this illustration a 4D Biochip arranged in the following combination (with a 384-feature 3D Biochip as an example) would require the following number of 3D biochips:

| Number of 3D biochips for 40,000 genes | Number of bio-elements on a 3D biochip (e.g., probes, etc.) | Number of bio-samples for a parallel assay |
|---|---|---|
| 40,000 | 1 | 384 |
| 20,000 | 2 | 192 |
| 10,000 | 4 | 96 |
| 5,000 | 8 | 48 |
| 3,333 | 12 | 32 |
| 2,500 | 16 | 24 |
| 1,667 | 24 | 16 |
| 1,250 | 32 | 12 |
| 833 | 48 | 8 |
| 417 | 96 | 4 |
| 208 | 384 | 1 |

As a further illustration, in 4D Biochips comprising 250, 500, or 1000 3D Biochips, the following combinations can be illustrated: Five 250–3D cubes have a potential to assay 40,000 genes for 12 human samples; Five 500-3D cubes have a potential to assay 40,000 genes for 24 human samples; Five 1,000-3D cubes have a potential of assaying 40,000 genes for 48 human samples; etcetera. Potentially, there is no limit to the arrangement of 4D biochips for either large or small applications.

To genotype 6,000 human samples for 20,000 genes using a 384-feature 3D-biochip to form a 4-D biochip various combinations are possible. For example, to generate 6,000×20,000=120,000,000 data points, approximately 312,500 384-feature 3D biochips are needed. If 384-feature 3D biochips form a 4D biochip, 500 4D biochips would be required for the experiment. To obtain the 500 4D biochips, 625 stampings are needed to produce 500 3D biochips for each of the stamping processes. The arrangement of a 3D biochip is shown in Figure XX, where each 3D biochip carries 32 unique genes with 12 replications. The 12 replications are for assaying 12 human individuals. The 625 stampings will produce 625 types of 3D biochips, which collectively carry the 20,000 genes. Then the 500×625 3D biochips will generate 500 4D biochips of 625 3D biochips each.

Each of the 500 4D biochips contains 20,000 genes and for genotyping 12 individuals. The 500 4D biochips can genotype 6,000 individuals for all 20,000 genes. For different applications, there are different arrangements to optimize the power and cost. For example, to assay 2,000 genes and 600 human samples, each 3D biochip has 32 genes for 12 human samples. In 63 stampings, 2016 genes are coated-fifty cubes with 63 3D biochips will genotype the 600 human samples for the 2,000 genes.

The 4D biochip of the present invention is also useful for very efficiently genotyping relatively small numbers of genes for a large number of human samples. For example, using the present invention 4D biochips, one can genotype 500 genes for 20,000 human samples using 52 4D biochips.

The following illustrates a method of determining the arrangements of the 4D-biochip design needed for a particular example (however, it is to be understood that this is not the only method for determining such arrangements, but merely exemplary of a variety of methods that would be readily determined by one of ordinary skill upon reading the present description):

Definitions:

G=number of total targets (e.g., genes)

P=number of samples (e.g., patients)

GP=number of data points

N=number of features in a 3D biochip

GP/N=number of 3D biochips needed g=number of genes in a 3D biochip

G/g=X=number of 3D biochips in a 4D cube=also number of stampings

N/g=number of samples for each cube

P/N/g=Pg/N=Y=number of 4D cubes

X=G/g; Y=Pg/N;

We want $$X + Y = \frac{G}{g} + \frac{Pg}{N} = \frac{NG + Pg^2}{NG} \to \text{minimum}$$

(the smallest combined number of stampings and assays) or $$\frac{Ng}{NG + Pg^2} \to \text{maximum}$$

Set $$\left[\frac{Ng}{NG + Pg^2}\right]' = 0$$

(Note: set the first derivative of $$\frac{Ng}{NG + Pg^2}$$

with respect to g to be 0)

We have $NG - Pg^2 = 0$ and the solutions are $$g = \sqrt{\frac{NG}{P}}$$

$$X = Y = \sqrt{\frac{PG}{N}}$$

Using the formulas disclosed above, the following examples illustrate how these formulas are employed:

Where N=384 features; G=2,000 genes; P=5,000 patients:

$$g = \sqrt{\frac{384 \times 2000}{5000}} = 12$$

X=2000/12=161 stampings
Y=5000×12.39/384=161 cubes
Where N=384; G=200; P=500:

$$X = Y = \sqrt{\frac{200 \times 500}{384}} = 16$$

In these two examples, demonstrate a primary advantage of the 4D biochip of the present invention. To genotype 5,000 patients for 2,000 genes, only 161–161=322 operations are required. To genotype 500 patients for 200 genes only 16'16=32 operations are required. To genotype all 35,000 genes for 5,000 patients, only 675+675=1350 operations (675 stampings and 675 assays) using a 384-feature biochip would be required. However, if a 1536-feature biochip is used for the task, only 337=337=675 operations are needed.

The user may desire to configure or arrange a 4D biochip depending on monetary and/or time considerations. Therefore, X and Y can be weighted by costs or time, dollars, duration, etc. For example, if "a" is a weight for X and "b" is a weight for Y, then to minimize the following is illustrated:

aX+bY→minimum $$aX = bY = aG/g + bPg/N = (aNG + bPg^2)/Ng$$

Set:

$$\left[\frac{Ng}{aNG + bPg^2}\right]' = 0$$

(note: set the first derivative of $$\frac{Ng}{aNG + bPg^2}$$

with respect to g to be 0)
We have the solutions:

$$g = \sqrt{\frac{aNG}{bP}}$$

$$X = \sqrt{\frac{bPG}{aN}}$$

$$Y = \sqrt{\frac{aPG}{bN}}$$

X/Y=b/a
Therefore, if N=384; G=2,000; P=5000; a=1; b=2:
X=228.2≈229
Y=114.1≈115

An application of employing the 4D biochip of the present invention is illustrated below:
To relate variations in gene expression to the molecular pharmacology of cancer and link bioinfomatics to chemoinformatics Scherf et al (Scherf et al, (2000) A gene expression database for the molecular pharmacology of cancer. *Nature Genetics:* 24:236–244.) generated relationships between drug activities and gene expression levels that are correlative, not causal, and they generate a hypothesis that must be tested. In this study the Cell line×gene (60×1,376) used 60 DNA microarrays (biochips) and cell line× compound (60×118). However, problems with the experiments described in this study are that the two data matrices generated are disconnected data sets in terms of gene expression responding to compound treatment. The results cannot be used directly for drug development. Furthermore, the relationship between drug activities and gene expression were based on correlation coefficients between the two disconnected data sets; and no direct connection between gene and compound treatments and no direct drug targets were identified.

Three-D data of cell line×gene×compound will result in a direct relationship between gene and compound treatments (drug targets and lead compounds). However, 7080 traditional biochips are needed to implement the experiment. The experiment is not feasible using conventional technology because fabricating and assaying the 7080 biochips would cost a significant (and prohibitive) amount of money and time. Most importantly, even the experiment can be implemented using the current DNA microarray technology the data may not result in any meaningful biological conclusion because of experimental errors and mishandling of the information flow.

Using the 4D biochip in this invention, this experiment can be implemented cost effectively, timely and accurately. To implement this experiment, 172 stampings and assaying 172 4D biochips, a total of 344 operations, are needed. The 4D biochip size will be 172 3D biochips. A total of 172 4D biochips can potentially generate 172×172×384=11,360,256 data points which will cover the needed 9,742,080 data points for the experiment and a large number of replications for quality control and statistical analysis.

Obviously, numerous modifications and variations on the present invention are possible in light of the above teachings. It is therefore to be understood that within the scope of the appended claims, the invention may be practiced otherwise than as specifically described herein.

What is claimed is:

1. An article in FIGS. 1 and 3 comprising: at least top plate 30, a bottom plate 40, and a center plate 20 wherein the center plate 20 defines a plurality of cylindrical capillaries 50, each capillary having a pair of opposed ends, with at least one capillary comprising a reagent inlet 52 and at least one capillary comprising a reagent outlet 54; the top plate 30 and bottom elate 40 further defining a plurality of channels 60 oriented substantially perpendicularly to the capillaries 50 and configured to selectively operably connect adjacent capillaries so as to form a continuous passage from the reagent inlet 52 to the reagent outlet 54, the channels being further configured to direct the reagent into a capillary at one end thereof and from the capillary at the other end thereof such that the reagent flows through substantially the length of the capillary and serially through all of the capillaries defined by the plate; and wherein said plates are positioned to substantially align the plurality of cylindrical capillaries from a first plate and a second plate.

2. The article according to claim 1, wherein the plates are substantially flat and further comprise a medial member disposed between and operably engaging opposing distal members.

3. The article according to claim 2, wherein the medial member defines the capillaries and the channels.

4. The article according to claim 2, wherein the medial member defines the capillaries and the distal member define the channels.

5. The article according to claim 2, further comprising at least one securing member configured to secure the distal members to the medial member in sealing relation.

6. The article according to claim 1, wherein the capillaries are disposed in an array.

7. The article according to claim 1, wherein the capillaries are between about 5 microns and about 11000 microns in diameter.

8. The article according to claim 1, wherein the capillaries are each configured to have a voltage applied across the ends thereof so as to form an electrostatic pump capable of causing the reagent to flow in a corresponding direction there between.

9. The article according to claim 8, wherein the voltage is reversible such that the flow of the reagent is capable of being selectively reversed.

10. The article according to claim 1, wherein the capillaries are each configured to have a bio sample deposited on the inner wall of the capillary such that the biosample is assayed by a reagent flowing through the capillary.

11. The article according to claim 1, wherein the plate is comprised of at least one of a semiconductor material and a polymeric material.

12. The article according to claim 11, wherein the plate is comprised of at least one of silicon and an injection-moldable polymeric material.

13. The article according to claim 11, wherein the plate is comprised of a polymeric material when the plate defines a capillary density up to 110 about 2,000 capillaries per square centimeter.

14. The article according to claim 11, wherein the plate is comprised of a semiconductor material when the plate defines a capillary density between about 2,000 capillaries per square centimeter and about 200,000 capillaries per square centimeter.

15. The article according to claim 1, which comprises at least 10 to 100 plates.

16. The article according to claim 1, which comprises at least 100 plates.

17. The article according to claim 1, which further comprises a volume-reducing arrayer apparatus, wherein said volume-reducing arrayer apparatus comprises: at least one plate disposed between the reservoir and the substrate and in communication with the reservoir, the at least one plate defining at least one plate capillary extending toward the substrate, the at least one plate capillary being configured to have a reduced volume with respect to the reservoir so as to receive a portion of the solution therefrom; and a flow control device disposed between the at least one plate and the substrate and in communication with the at least one plate, the flow control device defining at least one flow control capillary corresponding to the at least one plate capillary and extending toward the substrate, the at least one flow control capillary being configured to have a reduced volume with respect to the at least one plate capillary, the flow control device being further configured to control the flow of a predetermined amount of the solution through the at least one flow control capillary, from the at least one plate capillary to the substrate.

18. The article according to claim 17, wherein the at least one flow control capillary is configured to have a diameter smaller than the diameter of the plate capillary such that the smaller diameter of the flow control capillary provides a reduced volume per unit length with respect to the plate capillary.

19. The article according to claim 17, wherein the at least one plate defines a plurality of plate capillaries arranged in an array.

20. The article according to claim 19, wherein the flow control device defines a plurality of flow control capillaries arranged in an array corresponding to the plate capillary array.

21. The article according to claim 20, wherein at least one of the plate and the flow control device defines a plurality of channels configured such that each channel operably connects one plate capillary in the plate capillary array to one corresponding flow control capillary in the flow control device array.

22. The article according to claim 17, wherein the at least one plate comprise a first plate arid a second plate, with each plate having a solution entrance surface and a solution exit surface, and wherein the solution exit surface of the first plate is configured to operably engage the solution entrance surface of the second plate.

23. The article according to claim 22, wherein the first plate defines a plurality of first plate capillaries arranged in an array, the array further comprising a first portion of first plate capillaries arid a accord portion of first plate capillaries.

24. The article according to claim 23, wherein the solution exit surface of the first plate further defines a plurality of first plate channels, with each first plate channel extending from one capillary in the first portion of first plate capillaries to a corresponding indentation in a plurality of first plate indentations also defined by the solution exit surface of the first plate the first plate indentations also being arranged in an array.

25. The article according to claim 24, wherein the second plate defines a plurality of second plate capillaries arranged in an array, the array further comprising a first part of the second plate capillaries corresponding to the second portion of the first plate capillaries and a second part of second plate capillaries corresponding to the first plate indentations.

26. An arrayer apparatus according to claim 25, wherein the solution exit surface of the second plate further defines a plurality of second plate channels, with each second plate channel extending from one capillary in the first part of the second plate capillaries to a corresponding indentation in a plurality of second plate indentations also defined by the solution exit surface of the second plate, the second plate indentations also being arranged in an array.

27. The article according to claim 26, wherein the flow control device defines a plurality of flow control capillaries arranged in an array, the flow control capillaries corresponding to the second plate indentations and to the second part of the second plate capillaries corresponding to the first plate indentations.

28. The article according to claim 17, further comprising a stamper head disposed between the flow control device and the substrate and in communication with the flow control device, the stamper head defining a plurality of stamper capillaries arranged in an array and corresponding to the flow control capillaries, the stamper head being configured to channel the predetermined amount of the solution from the flow control device to the substrate.

29. The article according to claim 28, wherein the stamper capillaries are configured to have a reduced volume with respect to the flow control capillaries.

30. The article according to claim 29, wherein the stamper capillaries are each configured to have a diameter smaller than diameter of each flow control capillary such that smaller diameter of the stamper capillary provides a reduced volume per unit length with respect to the flow control capillary.

31. The article according to claim 17, wherein the flow control device comprises at least one of a pump and a valve.

32. The article according to claim 17, wherein the flow control capillaries are each configured to have a voltage applied between two points along the length thereof so as to form an electrostatic pump capable of causing the solution to flow therealong.

33. The article according to claim 32, wherein the voltage is capable of being adjusted so as to form an electrostatic valve capable of selectively preventing flow of the solution through the flow control capillaries.

34. The article according to claim 33, wherein the voltage is capable of being controlled such that only a predetermined amount of the solution flows through the flow control capillaries.

35. The article according to claim 17, wherein at least one of the flow control device and the at least one plate are comprised of silicon.

36. The article according to claim 1, which further comprises a volume-reducing arrayer apparatus, wherein said volume-reducing arrayer apparatus comprises: a reservoir for containing the solution at least one arrayer block disposed between the reservoir and the substrate and in communication with the reservoir, the at least one arrayer block defining at least one arrayer capillary extending toward the substrate, the at least one arrayer capillary being configured to have a reduced volume with respect to the reservoir so as to receive a portion of the solution therefrom; a flow control device disposed between the at least one arrayer block and the substrate and in communication with the at least one arrayer block, the flow control device defining at least one flow control capillary corresponding to the at least one arrayer capillary, extending toward the substrate, and being configured to have a reduced volume with respect to the at least one plate capillary, the flow control device being further configured to control the flow of a predetermined amount of the solution through the at least one flow control capillary; and a stamper head disposed between the flow control device and the substrate and in communication with the flow control device, the stamper head defining at least one stamper capillary corresponding to the at least one flow control capillary and extending toward the substrate, the at least one stamper capillary being configured to have the predetermined amount of the solution channeled therethrough by the flow control device, from the at least one flow control capillary to the substrate.

37. The article according to claim 36, wherein the at least one flow control capillary is configured to have a diameter smaller than the diameter of the at least one arrayer capillary such that smaller diameter of the flow control capillary provides a reduced volume per unit length with respect to the arrayer capillary.

38. The article according to claim 36, wherein the at least one stamper capillary is configured to have a diameter smaller than the diameter of the at least one flow control capillary such that smaller diameter of the stamper capillary provides a reduced volume per unit length with respect to the flow control capillary.

39. The article according to claim 36, wherein the at least one arrayer block defines a plurality of arrayer capillaries arranged in an array.

40. The article according to claim 39, wherein the flow control device defines a plurality of flow control capillaries arranged in an array corresponding to the arrayer capillary array.

41. The article according to claim 39, wherein the stamper head defines a plurality of stamper capillaries arranged in an array corresponding to the flow control capillary array.

42. The article according to claim 39, wherein at least one of the flow control device and the at least one arrayer block defines a plurality of channels configured such that each channel operably connects one arrayer capillary in the arrayer capillary array to one corresponding flow control capillary in the flow control device array.

43. The article according to claim 36, wherein the at least one arrayer block comprises a first arrayer block and a second arrayer block, with each arrayer block having a solution entrance surface and a solution exit surface, and wherein the solution exit surface of the first arrayer block is configured to operably engage the solution entrance surface of the second arrayer block.

44. The article according to claim 43, wherein the first arrayer block defines a plurality of first arrayer capillaries arranged in an array, the array further comprising a first portion of first arrayer capillaries and a second portion of first arrayer capillaries.

45. The article according to claim 44, wherein the solution exit surface of the first arrayer block further defines a plurality of first arrayer channel, with each first arrayer channel extending from one capillary in the first portion of first arrayer capillaries to a corresponding indentation in a plurality of first arrayer indentations also defined by the solution exit surface of the first arrayer block, the first mayor indentations also being arranged in an array.

46. The article according to claim 45, wherein the second arrayer block defines a plurality of second arrayer capillaries arranged in an array, the array further comprising a first part of the second arrayer capillaries corresponding to the second portion of the first arrayer capillaries and a second part of second arrayer capillaries corresponding to the first arrayer indentations.

47. The article according to claim 46, wherein the solution exit surface of the second arrayer block further defines a plurality of second arrayer channels, with each second arrayer channel extending from one capillary in the first part of the second arrayer capillaries to a corresponding indentation in a plurality of second arrayer indentations also defined by the solution exit surface of the second arrayer block, the second arrayer indentations also being arranged in an array.

48. The article according to claim 47, wherein the flow control device defines a plurality of flow control capillaries arranged in an array, the flow control capillaries corresponding to the second arrayer indentations and to the second part of the second arrayer capillaries corresponding to the first arrayer indentations.

49. The article according to claim 36, wherein the flow control device comprises at least one of a pump and a valve.

50. The article according to claim 36, wherein the flow control capillaries are each configured to have a voltage applied between two points along the length thereof so as to form an electrostatic pump capable of causing the solution to flow therealong.

51. The article according to claim 50, wherein the voltage is capable of being adjusted so as to form an electrostatic valve capable of selectively preventing flow of the solution through the flow control capillaries.

52. The article according to claim 50, wherein the voltage is capable of being controlled such that only a predetermined amount of the solution flows through the flow control capillaries.

53. The article according to claim 36, wherein at least one of the stamper head, the flow control device, and the at least one arrayer block are comprised of silicon.

54. A 4D biochip, comprising: m 3D biochip means, wherein m is an integer from 2 to 100,000 wherein each pair of adjacent 3D biochip means are operably connected by aligning capillaries present in one of said pair with capillaries present in the other of said pair.

55. The 4D biochip of claim 54, wherein each of said m 3D biochip means 3D contains n capillaries passing there through, wherein n is an integer from 2 to 100,000.

* * * * *